US006686055B2

(12) United States Patent
Tanaka et al.

(10) Patent No.: US 6,686,055 B2
(45) Date of Patent: Feb. 3, 2004

(54) POLYPROPYLENE COMPOSITE FILM

(75) Inventors: Yasuo Tanaka, Ichihara (JP); Masahiro Sugi, Ichihara (JP); Mamoru Kagami, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/147,088

(22) Filed: May 17, 2002

(65) Prior Publication Data

US 2002/0182426 A1 Dec. 5, 2002

Related U.S. Application Data

(63) Continuation of application No. 08/609,997, filed on Feb. 29, 1996, now abandoned.

(30) Foreign Application Priority Data

Mar. 2, 1995 (JP) ............................................... 7-43284
Mar. 2, 1995 (JP) ............................................... 7-43285

(51) Int. Cl.$^7$ ............................................... B32B 27/32
(52) U.S. Cl. ....................... 428/516; 428/910; 526/348; 526/943
(58) Field of Search ................................ 428/516, 910; 526/943, 348

(56) References Cited

U.S. PATENT DOCUMENTS

| | | | |
|---|---|---|---|
| 3,671,383 A | | 6/1972 | Sakata et al. |
| 4,252,851 A | | 2/1981 | Lansbury et al. |
| 4,990,640 A | | 2/1991 | Tsutsui et al. |
| 5,155,080 A | | 10/1992 | Elder et al. |
| 5,225,500 A | | 7/1993 | Elder et al. |
| 5,336,746 A | * | 8/1994 | Tsutsui et al. ............ 526/348.6 |
| 5,387,568 A | | 2/1995 | Ewen et al. |
| 5,504,172 A | * | 4/1996 | Imuta et al. ................. 526/351 |
| 5,525,689 A | * | 6/1996 | Tsutsui et al. ............... 526/160 |
| 5,639,842 A | * | 6/1997 | Tsutsui et al. ............... 526/348 |
| 5,714,426 A | * | 2/1998 | Tsutsui et al. ............... 502/117 |
| 5,739,366 A | * | 4/1998 | Imuta et al. .................. 556/11 |
| 5,753,769 A | * | 5/1998 | Ueda et al. .................. 525/323 |
| 5,767,033 A | * | 6/1998 | Imuta et al. ................. 502/114 |
| 5,916,988 A | * | 6/1999 | Tsutsui et al. ............... 526/348 |
| 5,959,046 A | * | 9/1999 | Imuta et al. ................. 526/127 |
| 5,969,049 A | * | 10/1999 | Ueda et al. .................. 525/247 |
| 5,998,039 A | * | 12/1999 | Tanizaki et al. ............. 428/516 |
| 6,001,293 A | * | 12/1999 | Wakamatsu et al. ... 264/173.14 |

FOREIGN PATENT DOCUMENTS

| | | |
|---|---|---|
| EP | 0146968 | 7/1985 |
| EP | 0320762 | 6/1989 |
| EP | 0426638 | 5/1991 |
| EP | 0427697 | 5/1991 |
| EP | 0659552 | 6/1995 |
| EP | 0668157 | 8/1995 |
| JP | 49-14343 | 4/1974 |
| JP | 53-114887 | 10/1978 |
| JP | 61-25546 | 6/1986 |
| WO | WO 88-05792 | 8/1988 |
| WO | WO 88-05793 | 8/1988 |

OTHER PUBLICATIONS

Coleman, et al., "General Theory of Stationary Random Sequences . . . ", J. Poly. Sci.: Part A, Vol, 1, pp. 3183–3197 (1963).

Carman, et al., "Monomer Sequence Distribution In Ethylene Propylene . . . ", Rubber Chemistry and Technology, pp. 781–804.

Wild, et al., "ansa–Metallocene Derivatives VII. Synthesis and Crystal . . . ", J. Organometallic Chem. , pp. 63–67 (1985).

Tsutsui, et al., "Propylene homo—and copolymerization with ethylene . . . ", Polymer, vol. 30, pp. 1350–1356 (Jul. 1989).

\* cited by examiner

*Primary Examiner*—D. Lawrence Tarazano
(74) *Attorney, Agent, or Firm*—Burns, Doane, Swecker & Mathis, LLP

(57) ABSTRACT

The polypropylene composite film of the present invention comprises (A) a crystalline polypropylene layer and (B) a propylene-1-butene random copolymer layer which is laminated on at least one surface of the crystalline polypropylene layer (A). The propylene/1-butene random copolymer (B) has the following properties: (1) the copolymer comprises 50 to 95% by mol of constituent units derived from propylene and 50 to 5% by mol of constituent units derived from 1-butene, (2) the intrinsic viscosity is 0.1 to 5 dl/g, (3) the molecular weight distribution (Mw/Mn) is not less than 3, and (4) the parameter B value is 1.0 to 1.5. The crystalline polypropylene layer (A) of this composite film may be unstretched, monoaxially stretched or biaxially oriented. The polypropylene composite film has excellent heat-sealing properties, such as low-temperature heat-sealing properties and heat-sealing strength, and hot tack properties. The polypropylene composite film is almost free from surface tackiness and shows good slip properties and high blocking resistance at high temperatures, so that it is suitable for high-speed packaging. In addition, this composite film also has good transparency and scratch resistance. The polypropylene composite film of the invention having the above-mentioned excellent properties can be favorably used for packaging of foods, fill packaging and fiber packaging.

6 Claims, No Drawings

POLYPROPYLENE COMPOSITE FILM

CROSS REFERENCE TO RELATED APPLICATION

This application is a Serial No. 08/609,997, filed Feb. 29, 1996 now abandoned, which in turn claims priority from Japanese Patent Application 43284/1995, filed Mar. 2 1995, and Japanese Patent Application 43285/1995, filed Mar. 2, 1995.

FIELD OF THE INVENTION

The present invention relates to a polypropylene composite film which is excellent not only in heat-sealing properties, such as low-temperature heat-sealing properties and heat-sealing strength and hot tack properties, but also in slip properties and blocking resistance.

BACKGROUND OF THE INVENTION

Crystalline polypropylene films are excellent in mechanical properties such as tensile strength, rigidity, surface hardness, impact strength and cold temperature resistance, optical properties such as gloss and transparency, and food hygienic properties such as non-toxicity and non-odorous property, and, therefore, they have been widely used for packaging of foods.

However, the crystalline polypropylene films are high in heat-sealable temperatures and they shrink when heated to the heat-sealing temperatures. Therefore, the crystalline polypropylene films are generally provided with heat-sealing layers.

The heat-sealing layer is required to have the following properties.

(1) The layer can be heat-sealed at a temperature considerably lower than that of the base layer (film of crystalline polypropylene);
(2) The layer is excellent in heat-sealing strength and is almost free from change of heat-sealing temperature with time;
(3) The layer is excellent in high bond strength to the substrate;
(4) The layer has transparency almost equal or higher than that of the base layer;
(5) The layer can be stored without blocking;
(6) The layer does not adhere to bag-making machines or fill packaging machines; and
(7) The layer has high scratch resistance.

For forming such heat-sealing layer, various polymers have been proposed. However, the conventional heat-sealing materials do not always satisfy all of these properties. For example, high- or low-density polyethylenes are poor in transparency, and ethylene-vinyl acetate copolymers or ethylene-α-olefin copolymers are poor in blocking resistance and scratch resistance.

As ethylene-α-olefin copolymers improved in the blocking resistance and the scratch resistance, ethylene-propylene copolymers have been proposed in Japanese Patent Publications No. 31478/1971 and No. 14343/1974. The ethylene-propylene copolymers have certainly excellent blocking resistance and scratch resistance and relatively good heat-sealing properties. Of such copolymers, an ethylene-propylene random copolymer is particularly excellent in the transparency and shows relatively good heat-sealing properties. However, the suitable heat-sealing temperature of the ethylene-propylene random copolymer proposed in the above Japanese Patent Publication No. 31478/1971 is higher than that of medium- or high-density polyethylenes by not lower than 10° C. Therefore, lowering of the suitable heat-sealing temperature of the copolymer has been desired.

As the ethylene component content in the copolymer becomes higher, the heat-sealing temperature (i.e., melting point) of this ethylene-propylene random copolymer lowers. Therefore, by increasing the ethylene component content in the copolymer, the improvement of low-temperature heat-sealing properties are realized. However, when the ethylene component content exceeds 10% by mol, the random copolymerizability of ethylene is reduced, leading to deterioration of the transparency. Besides, the blocking resistance and the scratch resistance are markedly lowered.

In place of the ethylene-propylene random copolymer, use of a copolymer of propylene and an α-olefin of 4 or more carbon atoms has been also proposed as a material of a heat-sealing layer. For instance, Japanese Patent Laid-Open Publication No. 128781/1975 has proposed a copolymer of propylene and an α-olefin of 4 to 10 carbon atoms, which is prepared in the presence of a titanium trichloride catalyst and contains 80 to 95% by weight (84.2 to 96.2% by mol when the α-olefin is 1-butene) of a propylene component. However, the suitable heat-sealing temperature of the propylene-1-butene copolymer described in this publication is still high, i.e., 130° C. or higher. Thus, it cannot be said that the low-temperature heat-sealing properties are improved as compared with those of the above-mentioned ethylene-propylene random copolymer and that the change of the heat-sealing properties with time caused by storage or the like is small.

By increasing the content of the 1-butene component, the heat-sealing temperature (melting point) of the propylene/1-butene copolymer can be lowered as described in, for example, Japanese Patent Publication No. 25546/1986 and Japanese Patent Laid-Open Publication No. 114887/1978. In these Publications, a composite film using a propylene/1-butene copolymer having good heat-sealing properties and a biaxially oriented film using a propylene/1-butene copolymer having improved heat-sealing properties are disclosed.

These propylene/1-butene copolymers are able to show improved low-temperature heat-sealing properties by virtue of increase the content of the 1-butene component. However, the films made from the copolymers come to exhibit tackiness and are deteriorated in slip properties and blocking resistance at high temperatures.

Therefore, the propylene/1-butene copolymers are desired to be improved in hot tack properties. Moreover, these copolymers are also desired to be improved in the low-temperature heat-sealing properties to such degrees that they are suitable for high-speed packaging.

Accordingly, it has been desired to develop a polypropylene composite film which is excellent not only in heat sealing properties, such as low-temperature heat-sealing properties and heat-sealing strength, and hot tack properties, but also in transparency, scratch resistance, blocking resistance and slip properties.

OBJECT OF THE INVENTION

The present invention has been made under such circumstances as mentioned above, and it is an object of the invention to provide a polypropylene composite film which is excellent in heat-sealing properties and hot tack properties as well as in transparency, scratch resistance, blocking resistance and slip properties.

SUMMARY OF THE INVENTION

The polypropylene composite film of the present invention comprises:

(A) a crystalline polypropylene layer, and (B) a propylene/1-butene random copolymer layer laminated on at least one surface of the crystalline polypropylene layer (A);

said propylene/1-butene random copolymer having the following properties:

(1) the copolymer contains 50 to 95% by mol of constituent units derived from propylene and 50 to 5% by mol of constituent units derived from 1-butene, (2) the intrinsic viscosity, as measured in Decalin (decahydronaphthalene, E.I. duPont de Nemours & Co., Wilmington, Del.) at 135° C., is in the range of 0.1 to 5 dl/g, (3) the molecular weight distribution (Mw/Mn), as determined by gel permeation chromatography (GPC), is not more than 3, and (4) the parameter B value, which indicates randomness of the copolymerized monomer sequence distribution, is in the range of 1.0 to 1.5.

It is preferred that the parameter B value of the propylene/1-butene random copolymer (B) is in the range of 1.0 to 1.3 and the copolymer (B) further has, in addition to the above properties (1) to (4), the following properties:

(5) the melting point Tm, as measured by a differential scanning calorimeter, is in the range of 60 to 140° C., and the melting point Tm and the 1-butene constituent unit content M (% by mol) satisfy the following relation:

$$-2.6M+130 \leq Tm \leq -2.3M+155$$

and (6) the crystallinity C, as measured by X-ray diffractometry, and the 1-butene constituent unit content M (% by mol) satisfy the following relation:

$$C \geq -1.5M+75$$

The propylene/1-butene random copolymer (B) is prepared by copolymerizing propylene and 1-butene in the presence of an olefin polymerization catalyst comprising:

(a) a transition metal compound represented by the following formula (I):

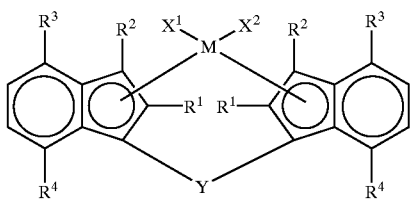

wherein M is a transition metal of Group IVb, Vb or VIb of the periodic table, $R^1$ and $R^2$ are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^3$ is a secondary or tertiary alkyl group of 3 to 20 carbon atoms or an aromatic group, $R^4$ is hydrogen or an alkyl group of 1 to 20 carbon atoms, $X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$— (R$^5$ is hydrogen, a halogen atom, a hydrocarbon group of 1 to 20 carbon atoms or a halogenated hydrocarbon group of 1 to 20 carbon atoms);

(b) (b-1) an organoaluminum oxy-compound and/or (b-2) a compound which reacts with the transition metal compound (a) to form an ion pair;

and, optionally, (c) an organoaluminum compound.

In the formula (I) that represents the transition metal compound (a), $R^1$ is preferably methyl.

The crystalline polypropylene layer (A) of the polypropylene composite film of the invention may be unstretched, monoaxially or biaxially stretched.

DETAILED DESCRIPTION OF THE INVENTION

The polypropylene composite film according to the present invention is formed from:

(A) a crystalline polypropylene layer, and (B) a specific propylene/1-butene random copolymer layer which is laminated on at least one surface of the crystalline polypropylene layer (A).

The components of the layers are described below.

(A) Crystalline Polypropylene Layer

The crystalline polypropylene layer (A) is a base layer of the polypropylene composite film of the invention, and this layer (A) may be an unstretched, monoaxially stretched or biaxially oriented layer.

In the present invention, any polypropylenes conventionally known for producing films can be used as the polypropylene, but it is preferred to use polypropylene having an isotactic index I.I. (boiling n-heptane-insoluble component) of not less than 75%, preferably 75 to 99%.

The crystalline polypropylene desirably has a density of 0.89 to 0.92 g/cm$^3$ and a melt index (230° C.) of 0.1 to 10.

Although homopolypropylene is generally used as the crystalline polypropylene, a propylene random copolymer containing small amounts (e.g., not more than 5% by mol) of constituent units derived from other olefin than propylene is also employable within limits not prejudicial to the object of the invention. Examples of such olefins include α-olefins of 2 to 20 carbon atoms, such as ethylene, 1-butene, 1-pentene, 1-hexene, 1-heptene, 1-octene, 1-decene, 1-dodecene, 1-hexadecene and 4-methyl-1-pentene.

The crystalline polypropylene used in the invention can be prepared by a conventional process using a known solid titanium catalyst or a known metallocene catalyst.

The crystalline polypropylene used in the invention desirably has a melting point higher than that of the below-described propylene/1-butene random copolymer.

To the crystalline polypropylene, various additives such as heat stabilizers, ultraviolet light absorbers, anti-blocking agents, slip agents and antistatic agents may be added.

(B) Propylene/1-Butene Random Copolymer Layer

The propylene/1-butene random copolymer layer (B) is a heat-sealing layer of the polypropylene composite film of the invention, and this layer is formed from a propylene/1-butene random copolymer having the following properties.

(1) The propylene/1-butene random copolymer contains:

constituent units derived from propylene in amounts of 50 to 95% by mol, preferably 55 to 93% by mol, more preferably 60 to 90% by mol, and constituent units derived from 1-butene in amounts of 5 to 50% by mol, preferably 7 to 45% by mol, more preferably 10 to 40% by mol.

This propylene/1-butene random copolymer may further contain constituent units derived from olefins other than propylene and 1-butene in small amounts, for example, not more than 10% by mol, preferably not more than 5% by mol.

(2) Intrinsic viscosity ($\eta$)

The intrinsic viscosity ($\eta$) of the propylene-1-butene random copolymer, as measured in decalin at 135° C., is in the range of 0.1 to 5 dl/g, preferably 0.5 to 4 dl/g, more preferably 1 to 3 dl/g.

(3) Molecular weight distribution

The molecular weight distribution (Mw/Mn) of the propylene-1-butene random copolymer, as determined by gel permeation chromatography (GPC), is not more than 3, preferably not more than 2.5.

(4) Randomness

The parameter B value of the propylene/1-butene random copolymer, which indicates randomness of the copolymerized monomer sequence distribution, is in the range of 1.0 to 1.5, preferably 1.0 to 1.3, more preferably 1.0 to 1.2.

The parameter B value was proposed by B. D. Coleman and T. G. Fox (J. Polym. Sci., Al, 3183 (1963)), and this parameter is defined as follows:

$$B = P_{12}/(2P_1 \cdot P_2)$$

wherein $P_1$ is a first monomer content fraction and $P_2$ is a second monomer content fraction, and $P_{12}$ is a proportion of the first monomer-second monomer sequences to the total diad sequences.

In the case of B=1, Bernoulli's statistics apply to the copolymer; in the case of B<1, the copolymer tends to be block; and in the case of B>1, the copolymer tends to be alternating.

In addition to the above properties (1) to (4), the propylene/1-butene random copolymer preferably further has the following properties (5) and (6).

(5) The melting point Tm, as measured by a differential scanning calorimeter, is in the range of 60 to 140° C., preferably 80 to 130° C., and besides the melting point Tm and the 1-butene constituent unit content M (% by mol) satisfy the following relation:

$$-2.6M + 130 \leq TM \leq -2.3M + 155$$

(6) The crystallinity C, as measured by X-ray diffractometry, and the 1-butene constituent unit content M (% by mol) satisfy the following relation:

$$C \geq -1.5M + 75$$

When the base layer of the polypropylene composite film of the present invention is an unstretched crystalline polypropylene layer, it is desired that the crystallinity of the propylene/1-butene random copolymer is in the range of 15 to 65%, preferably 30 to 60%.

When the base layer of the polypropylene composite film is a biaxially oriented crystalline polypropylene layer, it is desired that the crystallinity of the propylene/1-butene random copolymer is in the range of 15 to 65%, preferably 15 to 60%, more preferably 20 to 60%.

The propylene/1-butene random copolymer may contain regio-irregular units based on 2,1-insertions of the propylene monomer, said regio-irregular units being determined from a $^{13}$C-NMR spectrum of the copolymer. The regio-irregular units based on the 2,1-insertions of the propylene monomer in all the propylene constituent units may be not less than 0.05%.

In the polymerization, the propylene monomer is generally 1,2-inserted (methylene side is bonded to catalyst), but in rare cases it is 2,1-inserted. The 2,1-inserted propylene monomer forms regio-irregular units in the resulting polymer.

The proportion of the 2,1-insertions to all the propylene constituent units in the polymer can be determined from the following equation utilizing $^{13}$C-NMR with reference to "Polymer", 30, 1350 (1989).

$$\text{Proportion of regio-irregular unites based on 2,1-insertions} = \frac{\{0.5\ I\alpha\beta\ (\text{structure } (iii), (v)) + 0.25\ I\alpha\beta\ (\text{structure } (iv))\}}{I\alpha\alpha + I\alpha\beta\ (\text{structure } (iii), (v)) + 0.5\ (I\alpha\gamma + I\alpha\beta\ (\text{structure } (iv)) + I\alpha\delta)} \times 100$$

The peaks are named in accordance with a method by Carman, et al. (Rubber Chem. Tachnol., 44, 781 (1971). The symbol $I\alpha\beta$ or the like in the above equation means a peak area of the $\alpha\beta$ peak or the like.

When it is difficult to directly determine the area of $I\alpha\beta$ or the like from the spectrum because of, for example, overlapping of the peaks, correction can be made using the carbon peaks having corresponding areas.

In the propylene/1-butene random copolymer used in the invention, the regio-irregular units based on 1,3-insertions of the propylene monomer may be not more than 0.05%.

The quantities of the triad sequences based on the propylene 1,3 insertions can be determined from the $\beta\gamma$ peak (resonance at 27.4 ppm or thereabout).

The propylene/1-butene random copolymer layer (B) for forming the polypropylene composite film of the present invention has the above-mentioned features, so that it exhibits excellent heat-sealing properties.

When the intrinsic viscosity ($\eta$) (property (2)) of the propylene/1-butene random copolymer exceeds 5 dl/g, the copolymer shows poor moldability and hardly form a thin layer having a desired thickness for a heat-sealing layer, specifically not more than 10 $\mu$m. On the other hand, when the intrinsic viscosity ($\eta$) is less than 0.1 dl/g, the copolymer shows sometimes poor moldability and heat-sealing strength.

When the melting point (property (5)) of the propylene/1-butene copolymer exceeds 140° C., the suitable heat-sealing temperature of the film becomes as high as 130° C. or higher. On the other hand, when the melting point is lower than 60° C., the low-temperature heat-sealing properties are improved, but scratch resistance is lowered, and besides film blocking takes place when the film is stored, resulting in difficulty of practical use.

The crystallinity of the propylene/1-butene random copolymer is in the range of 15 to 65% because it exhibits good low-temperature heat-sealing properties and high blocking resistance. When the crystallinity of the copolymer is less than 15%, the copolymer comes short of scratch resistance, easily suffer blocking and becomes tacky. When the crystallinity exceeds 65%, the low-temperature heat-sealing properties cannot be sufficiently improved.

The propylene/1-butene random copolymer used in the present invention can be prepared by copolymerizing propylene and 1-butene in the presence of an olefin polymerization catalyst comprising:

(a) a specific transition metal compound described later;
(b) (b-1) an organoaluminum oxy-compound and/or (b-2) a compound which reacts with the transition metal compound (a) to form an ion pair;

and, optionally, (c) an organoaluminum compound.

The olefin polymerization catalyst used in the invention is described below in detail.

The transition metal compound (a) (hereinafter sometimes referred to as "component (a)") for forming the olefin polymerization catalyst used in the invention is represented by the following formula (I):

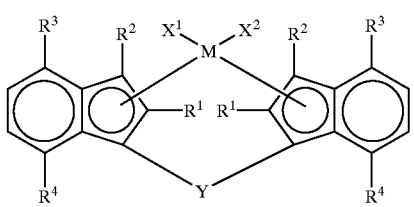

In the formula (I), M is a transition metal atom of Group IVb, Group Vb and Group VIb of the periodic table, specifically titanium, zirconium, hafnium, vanadium, niobium, tantalum, chromium, molybdenum and tungsten, preferably titanium, zirconium and hafnium, particularly preferably zirconium.

Substituents $R^1$ and $R^2$ $R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include those wherein halogens are substituted in the above-exemplified hydrocarbon groups.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylislyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylphenyl.

Examples of the oxygen-containing groups include hydroxyl groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing groups.

Examples of the nitrogen-containing groups include amino groups; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino.

Of these, preferred as $R^1$ is hydrogen, methyl, a hydrocarbon group of 2 to 6 carbon atoms or an aromatic group, and particularly preferred is methyl or a hydrocarbon group of 2 to 6 carbon atoms.

Preferred as $R^2$ is hydrogen or a hydrocarbon group, and particularly preferred is hydrogen.

Substituent $R^3$ $R^3$ is a hydrocarbon group of 1 to 20 carbon atoms or said group substituted with a halogen atom or a silicon-containing group, and above all it is preferably a secondary or tertiary alkyl group of 3 to 20 carbon atoms or an aromatic group.

Examples of the secondary or tertiary alkyl groups include i-propyl, i-butyl, sec-butyl, tert-butyl, 1,2-dimethylpropyl, 2,3-dimethylbutyl, iso-pentyl, tert-pentyl, neopentyl, cyclopentyl, cyclohexyl, 4-methylcyclohexyl, iso-hexyl, norbornyl and adamantyl.

Examples of the aromatic groups include aryl groups, such as phenyl, tolyl, dimehylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl; and arylalkyl groups, such as benzyl, phenylethyl, phenylpropyl and tolylmethyl.

These groups may contain a double bond or a triple bond. Further, these groups may be substituted with halogen atoms or silicon-containing groups as described for $R^1$.

Substituent $R^4$ $R^4$ is hydrogen or an alkyl group of 1 to 20 carbon atoms.

Examples of the alkyl groups include chain and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl.

These groups may be substituted with such halogen atoms or silicon-containing groups as described for $R^1$.

$X^1$ and $X^2$ $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of such atoms and groups include the same halogen atoms, hydrocarbon groups of 1 to 20 carbon atoms, halogenated hydrocarbon groups of 1 to 20 carbon atoms, oxygen-containing groups and sulfur containing groups as described above for $R^1$.

Also employable as the sulfur-containing groups are sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato, pentafluorobenzenesulfinato and trifluoromethanesulfinato.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O) (R$^5$)—, —BR$^5$— or AlR$^5$— (R$^5$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups of 1 to 20 carbon atoms include those wherein halogens are substituted in the above-exemplified divalent hydrocarbon groups of 1 to 20 carbon atoms, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene); and alkyldisilyl, alkylaryldisilyl and arylsilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

R$^5$ is the same halogen atom, hydrocarbon group of 1 to 20 carbon atoms or halogenated hydrocarbon group of 1 to 20 carbon atoms as described above for R$^1$.

Of the above groups, preferred are divalent silicon-containing groups, divalent germanium-containing groups and divalent tin-containing groups. Among them, more preferred are divalent silicon-containing groups, and of these, particularly preferred are alkylsilylene, alkylarylsilylene and arylsilylene.

Listed below are examples of the transition metal compounds represented by the formula (I).

rac-Dimethylsilylene-bis{1-(2,7-dimethyl-4-ethylindenyl)}zirconium dichloride, rac-Dimethylsilylene-bis{1-(2,7-dimethyl-4-n-propylindenyl)}zirconium dichloride, rac-Dimethylsilylene-bis{1-(2,7-dimethyl-4-i-propylindenyl)}zirconium dichloride, rac-Dimethylsilylene-bis{1-(2,7-dimethyl-4-n-butylindenyl)}zirconium dichloride, rac-Dimethylsilylene-bis{1-(2,7-dimethyl-4-sec-butylindenyl)}zirconium dichloride, rac-Dimethylsilylene-bis{1-(2,7-dimethyl-4-t-butylindenyl)}zirconium dichloride, rac-Dimethylsilylene-bis{1-(2,7-dimethyl-4-n-pentylindenyl)}zirconium dichloride, rac-Dimethylsilylene-bis{1-(2,7-dimethyl-4-n-hexylindenyl)}zirconium dichloride, rac-Dimethylsilylene-bis{1-(2,7-dimethyl-4-cyclohexylindenyl)}zirconium dichloride, rac-Dimethylsilylene-bis{1-(2,7-dimethyl-4-methylcyclohexylindenyl)}zirconium dichloride, rac-Dimethylsilylene-bis{1-(2,7-dimethyl-4-phenylethylindenyl)}zirconium dichloride, rac-Dimethylsilylene-bis{1-(2,7-dimethyl-4-phenyldichloromethylindenyl)}zirconium dichloride, rac-Dimethylsilylene-bis{1-(2,7-dimethyl-4-chloromethylindenyl)}zirconium dichloride, rac-Dimethylsilylene-bis{1-(2,7-dimethyl-4-trimethylsilylenemethylindenyl)}zirconium dichloride, rac-Dimethylsilylene-bis{1-(2,7-dimethyl-4-trimethylsiloxymethylindenyl)}zirconium dichloride, rac-Diethylsilylene-bis{1-(2,7-dimethyl-4-i-propylindenyl)}zirconium dichloride, rac-Di(i-propyl)silylene-bis{1-(2,7-dimethyl-4-i-propylindenyl)}zirconium dichloride, rac-Di(n-butyl)silylene-bis{1-(2,7-dimethyl-4-i-propylindenyl)}zirconium dichloride, rac-Di(cyclohexyl)silylene-bis{1-(2,7-dimethyl-4-i-propylindenyl)}zirconium dichloride, rac-Methylphenyisilylene-bis{1-(2,7-dimethyl-4-i-propylindenyl)}zirconium dichloride, rac-Methylphenylsilylene-bis{1-(2,7-dimethyl-4-t-butylindenyl)}zirconium dichloride, rac-Diphenylsilylene-bis{1-(2,7-dimethyl-4-t-butylindenyl)}zirconium dichloride, rac-Diphenylsilylene-bis{1-(2,7-dimethyl-4-i-propylindenyl)}zirconium dichloride, rac-Diphenylsilylene-bis{1-(2,7-dimethyl-4-ethylindenyl)}zirconium dichloride, rac-Di(p-tolyl)silylene-bis{1-(2,7-dimethyl-4-i-propylindenyl)}zirconium dichloride, rac-Di(p-chlorophenyl)silylene-bis{1-(2,7-dimethyl-4-i-propylindenyl)}zirconium dichloride, rac-Dimethylsilylene-bis{1-(2-methyl-4-i-propyl-7-ethylindenyl)}zirconium dibromide, rac-Dimethylsilylene-bis{1-(2,7-dimethyl-4-i-propylindenyl)}zirconium dimethyl, rac-Dimethylsilylene-bis{1-(2,7-dimethyl-4-i-propylindenyl)}zirconium methylchloride, rac-Dimethylsilylene-bis{1-(2,7-dimethyl-4-i-propylindenyl)}zirconium bis(trifluoromethanesulfonato), rac-Dimethylsilylene-bis{1-(2,7-dimethyl-4-i-propylindenyl)}zirconium bis(p-phenylsulfinato), and rac-Dimethylsilylene-bis{1-(2-phenyl-4-i-propyl-7-methylindenyl)}zirconium dichloride.

Of the transition metal compounds represented by the formula (I), particularly preferably used are compounds represented by the following formula (I-a):

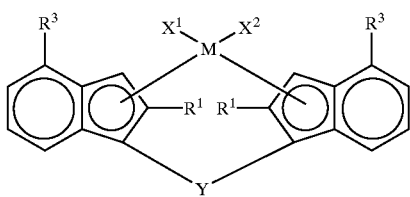

(I-a)

wherein M, $X^1$, $X^2$, $R^1$, $R^3$ and Y are identical with those in the formula (I), and $R^1$ is preferably hydrogen, methyl or an aromatic group.

Listed below are examples of the transition metal compounds represented by the formula (I-a).

rac-Dimethylsilylene-bis{1-(4-phenylindenyl)}zirconium dichloride,
rac-Dimethylsilylene-bis{1-(2-methyl-4-phenylindenyl)}zirconium dichloride,
rac-Dimethylsilylene-bis{1-(2-methyl-4-(α-naphthyl)indenyl)}zirconium dichloride,
rac-Dimethylsilylene-bis{1-(2-methyl-4-(β-naphthyl)indenyl)}zirconium dichloride,
rac-Dimethylsilylene-bis{1-(2-methyl-4-(1-anthracenyl)indenyl)}zirconium dichloride,
rac-Dimethylsilylene-bis{1-(2-methyl-4-(2-anthracenyl)indenyl)}zirconium dichloride,
rac-Dimethylsilylene-bis{1-(2-methyl-4-(9-anthracenyl)indenyl)}zirconium dichloride,
rac-Dimethylsilylene-bis{1-(2-methyl-4-(9-phenanthryl)indenyl)}zirconium dichloride,
rac-Dimethylsilylene-bis{1-(2-methyl-4-(p-fluorophenyl)indenyl)}zirconium dichloride,
rac-Dimethylsilylene-bis{1-(2-methyl-4-(pentafluorophenyl)indenyl)}zirconium dichloride,
rac-Dimethylsilylene-bis{1-(2-methyl-4-(p-chlorophenyl)indenyl)}zirconium dichloride,
rac-Dimethylsilylene-bis{1-(2-methyl-4-(m-chlorophenyl)indenyl)}zirconium dichloride,
rac-Dimethylsilylene-bis{1-(2-methyl-4-(o-chlorophenyl)indenyl)}zirconium dichloride,
rac-Dimethylsilylene-bis{1-(2-methyl-4-(o,p-dichlorophenyl)phenyl-1-indenyl)}zirconium dichloride,
rac-Dimethylsilylene-bis{1-(2-methyl-4-(p-bromophenyl)indenyl)}zirconium dichloride,
rac-Dimethylsilylene-bis{1-(2-methyL-4-(p-tolyl)indenyl)}zirconium dichloride,
rac-Dimethylsilylene-bis{1-(2-methyl-4-(m-tolyl)indenyl)}zirconium dichloride,
rac-Dimethylsilylene-bis{1-(2-methyl-4-(o-tolyl)indenyl)}zirconium dichloride,
rac-Dimethylsilylene-bis{1-(2-methyl-4-(o,o-dimethylphenyl)indenyl)}zirconium dichloride,
rac-Dimethylsilylene-bis{1-(2-methyl-4-(p-ethylphenyl)indenyl)}zirconium dichloride,
rac-Dimethylsilylene-bis{1-(2-methyl-4-(p-i-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenyl)indenyl)}zirconium dichloride,
rac-Dimethylsilylene-bis{1-(2-methyl-4-(m-biphenyl)indenyl)}zirconium dichloride,
rac-Dimethylsilylene-bis{1-(2-methyl-4-(p-trimethylsilylphenyl)indenyl)}zirconium dichloride,
rac-Dimethylsilylene-bis{1-(2-methyl-4-(m-trimethylsilylphenyl)indenyl)}zirconium dichloride,
rac-Dimethylsilylene-bis{1-(2-phenyl-4-phenylindenyl)}zirconium dichloride,
rac-Diethylsilylene-bis{1-(2-methyl-4-phenylindenyl)}zirconium dichloride,
rac-Di(i-propyl)silylene-bis{1-(2-methyl-4-phenylindenyl)}zirconium dichloride,
rac-Di(n-butyl)silylene-bis{1-(2-methyl-4-phenylindenyl)}zirconium dichloride,
rac-Dicyclohexylsilylene-bis{1-(2-methyl-4-phenylindenyl)}zirconium dichloride,
rac-Methylphenylsilylene-bis{1-(2-methyl-4-phenylindenyl)}zirconium dichloride,
rac-Diphenylsilylene-bis{1-(2-methyl-4-phenylindenyl)}zirconium dichloride,
rac-Di(p-tolyl)silylene-bis{1-(2-methyl-4-phenylindenyl)}zirconium dichloride,
rac-Di(p-chlorophenyl)silylene-bis{1-(2-methyl-4-phenylindenyl)}zirconium dichloride,
rac-Methylene-bis{1-(2-methyl-4-phenylindenyl)}zirconium dichloride,
rac-Ethylene-bis{1-(2-methyl-4-phenylindenyl)}zirconium dichloride,
rac-Dimethylgermylene-bis{1-(2-methyl-4-phenylindenyl)}zirconium dichloride,
rac-Dimethylstannylene-bis{1-(2-methyl-4-phenylindenyl)}zirconium dichloride,
rac-Dimethylsilylene-bis{1-(2-methyl-4-phenylindenyl)}zirconium dibromide,
rac-Dimethylsilylene-bis{1-(2-methyl-4-phenylindenyl)}zirconium dimethyl,
rac-Dimethylsilylene-bis{1-(2-methyl-4-phenylindenyl)}zirconium methylchloride,
rac-Dimethylsilylene-bis{1-(2-methyl-4-phenylindenyl)}zirconium chloride $SO_2Me$,
rac-Dimethylsilylene-bis{1-(2-methyl-4-phenylindenyl)}zirconium chloride $OSO_2Me$,
rac-Dimethylsilylene-bis{1-(2-methyl-4-phenylindenyl)}zirconium monochloride mono(trifluoromethanesulfonato),
rac-Dimethylsilylene-bis{1-(2-methyl-4-phenylindenyl)}zirconium di(trifluoromethanesulfonato),
rac-Dimethylsilylene-bis{1-(2-methyl-4-phenylindenyl)}zirconium di(p-toluenesulfonato),
rac-Dimethylsilylene-bis{1-(2-methyl-4-phenylindenyl)}zirconium di(methylsulfonato),
rac-Dimethylsilylene-bis{1-(2-methyl-4-phenylindenyl)}zirconium di(trifluoromethanesulfinato),
rac-Dimethylsilylene-bis{1-(2-methyl-4-phenylindenyl)}zirconium di(trifluoroacetate),
rac-Dimethylsilylene-bis{1-(2-methyl-4-phenylindenyl)}zirconium monochloride(n-butoxide),
rac-Dimethylsilylene-bis{1-(2-methyl-4-phenylindenyl)}zirconium di(n-butoxide), and
rac-Dimethylsilylene-bis{1-(2-methyl-4-phenylindenyl)}zirconium monochloride(phenoxide).

Of the above compounds, particularly preferred are those wherein $R^1$ is methyl.

Also preferred are transition metal compound of the formula (I-a) wherein $R^1$ is a hydrocarbon group of 2 to 6 carbon atoms and $R^3$ is an aryl group of 6 to 16 carbon atoms. Listed below are examples of such preferred compounds.

rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl)}zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichloride,
rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride,
rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-(α-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilyiene-bis{1-(2-i-propyl-4-phenylindenyl)}zirconium dichloride,
rac-Dimethylsilylene-bis{1-(2-i-propyl-4-(α-naphthyl)indenyl)}zirconium dichloride,
rac-Dimethylsilylene-bis{1-(2-i-propyl-4-(β-naphthyl)indenyl)}zirconium dichloride,
rac-Dimethylsilylene-bis{1-(2-i-propyl-4-(2-methyl-1-naphthyl)indenyl)}zirconium dichloride,
rac-Dimethylsilylene-bis{1-(2-i-propyl-4-(5-acenaphthyl)indenyl)}zirconium dichloride,
rac-Dimethylsilylene-bis{1-(2-i-propyl-4-(9-anthracenyl)indenyl)}zirconium dichloride,
rac-Dimethylsilylene-bis{1-(2-i-propyl-4-(9-phenanthryl)indenyl)}zirconium dichloride,
rac-Dimethylsilylene-bis{1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilylene-bis{1-(2-s-butyl-4-(β-naphthyl)indenyl)}zirconium dichloride,
rac-Dimethylsilylene-bis{1-(2-s-butyl-4-(8-methyl-9-naphthyl)indenyl)}zirconium dichloride,
rac-Dimethylsilylene-bis{1-(2-s-butyl-4-(5-acenaphthyl)indenyl)}zirconium dichloride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichloride,
rac-Dimethylsilylene-bis{1-(2-n-butyl-4-(α-naphthyl)indenyl)}zirconium dichloride,
rac-Dimethylsilylene-bis{1-(2-n-butyl-4-(p-naphthyl)indenyl)}zirconium dichloride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-panthracenyl)indenyl)}zirconium dichloride,
rac-Dimethylsilylene-bis{1(2-i-butyl-4-(9-naphthyl)indenyl)}zirconium dichloride,
rac-Dimethylsilylene-bis{1-(2-i-butyl-4-(β-naphenylindenyl)}zirconium dichloride,
rac-Dimethylsilylene-bis{1-(2-i-butyl-4-(2-naphthyl)indenyl)}zirconium dichloride,
rac-Dimethylsilylene-bis{1-(2-i-butyl-4-(5-acenaphthyl)indenyl)}zirconium dichloride,
rac-Dimethylsilylene-bis{1-(2-i-butyl-4-(2-methyl-1-naphthyl)indenyl)}zirconium dichloride,
rac-Dimethylsilylene-bis{1-(2-i-butyl-4-(5-acenaphthyl)indenyl)}zirconium dichloride,
rac-Dimethylsilylene-bis{1-(2-i-butyl-4-(9-anthracenyl)indenyl)}zirconium dichloride, rac-Dimethylsilylene-bis{1-(2-i-butyl-4-(9-phenanthryl)indenyl)}zirconium dichloride, rac-Dimethylsilylene-bis{1-(2-neopentyl-4-phenylindenyl)}zirconium dichloride, rac-Dimethylsilylene-bis{1-(2-neopentyl-4-(α-naphthyl)indenyl)}zirconium dichloride, rac-Dimethylsilyiene-bis{1-(2-n-hexyl-4-phenylindenyl)}zirconium dichloride, rac-Dimethylsilylene-bis{1-(2-n-hexyl-4-(α-naphthyl)indenyl)}zirconium dichloride, rac-Methylphenylsilylene-bis{1-(2-ethyl-4-phenylindenyl)}zirconium dichloride, rac-Methylphenylsilylene-bis{1-(2-ethyl-4-(α-naphthyl)indenyl)}zirconium dichloride, rac-Methylphenylsilylene-bis{1-(2-ethyl-4-(9-anthracenyl)indenyl)}zirconium dichloride, rac-Methylphenylsilylene-bis{1-(2-ethyl-4-(9-phenanthryl)indenyl)}zirconium dichloride, rac-Diphenylsilylene-bis{1-(2-ethyl-4-phenylindenyl)}zirconium dichloride, rac-Diphenylsilylene-bis{1-(2-ethyl-4-(α-naphthyl)indenyl)}zirconium dichloride, rac-Diphenylsilyiene-bis{1-(2-ethyl-4-(9-anthracenyl)indenyl)}zirconium dichloride, rac-Diphenylsilylene-bis{1-(2-ethyl-4-(9-phenanthryl)indenyl)}zirconium dichloride, rac-Diphenylsilylene-bis{1-(2-ethyl-4-(4-biphenylyl)indenyl)}zirconium dichloride, rac-Methylene-bis{1-(2-ethyl-4-phenylindenyl)}zirconium dichloride, rac-Methylene-bis{1-(2-ethyl-4-(α-naphthyl)indenyl)}zirconium dichloride, rac-Ethylene-bis{1-(2-ethyl-4-phenylindenyl)}zirconium dichloride, rac-Ethylene-bis{1-(2-ethyl-4-(α-naphthyl)indenyl)}zirconium dichloride, rac-Ethylene-bis{1-(2-n-propyl-4-(α-naphthyl)indenyl)}zirconium dichloride, rac-Dimethylgermylene-bis{1-(2-ethyl-4-phenylindenyl)}zirconium dichloride, rac-Dimethylgermylene-bis{1-(2-ethyl-4-(α-naphthyl)indenyl)}zirconium dichloride, rac-Dimethylgermylene-bis{1-(2-n-propyl-4-phenylindenyl)}zirconium dichloride, rac-Dimethylstannylene-bis{1-(2-ethyl-4-phenylindenyl)}zirconium dichloride, rac-Dimethylstannylene-bis{1-(2-ethyl-4-(α-naphthyl)indenyl)}zirconium dichloride, rac-Dimethylstannylene-bis{1-(2-n-ethyl-4-(9-phenanthryl)indenyl)}zirconium dichloride, and rac-Dimethylstannylene-bis{1-(2-n-propyl-4-phenylindenyl)}zirconium dichloride.

Also employable are transition metal compounds wherein zirconium is replaced with titanium, hafnium, vanadium, niobium, tantalum, chromium, molybdenum or tungsten in the above-mentioned compounds.

In the present invention, a racemic modification of the transition metal compound is generally used as the olefin polymerization catalyst component, but R type or S type is also employable.

The transition metal compounds employable in the invention can be prepared in accordance with "Journal of Organometallic Chem." 288(1985), pp. 63–67 and European Patent Publication No. 0,320,762 (Specification and Examples).

The organoaluminum oxy-compound (b-1) (hereinafter sometimes referred to as "component (b-1)") for forming the olefin polymerization catalyst used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the adsorbed water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is also possible that the solvent or the unreacted organoaluminum compound is distilled off from the recovered solution of aluminoxane and the remainder is redissolved or suspended in a poor solvent for aluminoxane.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, preferred are trialkylaluminums and tricycloalkylaluminums, and particularly preferred is trimethylaluminum.

Also employable as the organoaluminum compound used for preparing the aluminoxane is isoprenylaluminum represented by the following formula (II):

$(i\text{-}C_4H_9)_x Al_y (C_5H_{10})_z$     (II)

wherein x, y, z are each a positive number, and $z \geq 2x$.

The organoaluminum compounds mentioned above are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferred are aromatic hydrocarbons and aliphatic hydrocarbons.

The compound (b-2) which reacts with the transition metal compound (a) to form an ion pair (hereinafter sometimes referred to as "compound (b-2)"), that is used in the invention, includes Lewis acid, ionic compounds and carbonate compounds described in Japanese Patent Laid-Open Publications No. 501950/1989, No. 502036/1989, No. 179005/1991, No. 199006/1991, No. 207703/1991 and No. 207704/1991.

Examples of the Lewis acid include triphenylboron, tris(4-fluorophenyl)boron, tris(p-tolyl)boron, tris(o-tolyl)boron, tris(3,5-dimethylphenyl)boron, tris(pentafluorophenyl)boron, $MgCl_2$, $Al_2O_3$ and $SiO_2$—$Al_2O_3$.

Examples of the ionic compounds include triphenylcarbeniumtetrakis(pentafluorophenyl)borate, tri-n-butylammoniumtetrakis(pentafluorophenyl)borate, N,N-dimethylaniliniumtetrakis(pentafluorophenyl)borate and ferroceniumtetra(pentafluorophenyl)borate.

Examples of the carborane compounds include dodecaborane, 1-carbaundecaborane, bis-n-butylammonium (1-carbedodeca)borate, tri-n-butylammonium(7,8-dicarbaundeca)borate and tri-n-butylammonium (tridecahydride-7-carbaundeca)borate.

The compounds (b-2) which react with the transition metal compound (a) to form an ion pair can be used in combination of two or more kinds.

The organoaluminum compound (c) (hereinafter sometimes referred to as "component (c)"), that is used to form the olefin polymerization catalyst employable in the invention, is, for example, an organoaluminum compound represented by the following formula (III):

$$R^9{}_nAlX_{3-n} \qquad (III)$$

wherein $R^9$ is a hydrocarbon group of 1 to 12 carbon atoms, X is a halogen atom or hydrogen, and n is 1 to 3.

In the formula (III), $R^9$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds (c) include:

trialkylaluminums, such as trimethylaluminum, triethylaluminum, triisopropylaluminum, triisobutylaluminum, trioctylaluminum, tri(2-ethylhexyl)aluminum tridecylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (c) is a compound represented by the following formula (IV):

$$R^9{}_nAlL_{3-n} \qquad (IV)$$

wherein $R^9$ is the same as above; L is —$OR^{10}$ group, —$OSiR^{11}{}_3$ group, —$OAlR^{12}{}_2$ group, —$NR^{13}{}_2$ group, —$SiR^{14}{}_3$ group or —$N(R^{15})AlR^{16}{}_2$ group; n is 1 or 2; $R^{10}$, $R^{11}$, $R^{12}$ and $R^{16}$ are each methyl, ethyl, isopropyl, isobutyl, cyclohexyl, phenyl or the like; $R^{13}$ is hydrogen, methyl, ethyl, isopropyl, phenyl, trimethylsilyl or the like; and $R^{14}$ and $R^{15}$ are each methyl, ethyl or the like.

Of the organoaluminum compounds represented by the above formula, preferred are compounds of the formula $R^7{}_nAl(OAlR^{10}{}_2)_{3-n}$, for example, $Et_2AlOAlEt_2$ and $(iso\text{-}Bu)_2AlOAl(iso\text{-}Bu)_2$.

Among the organoaluminum compounds represented by the formulas (III) and (IV), preferred are compounds of the formula $R^7{}_3Al$, and particularly preferred are compounds of said formula wherein R is an isoalkyl group.

The olefin polymerization catalyst used in the invention is formed from the component (a), the component (b-1) and/or the component (b-2) (i.e., component (b)), and, if desired, the component (c). The olefin polymerization catalyst can be prepared by mixing the components (a) and (b) and, if desired, the component (c) in an inert hydrocarbon solvent or an olefin solvent.

Examples of the inert hydrocarbon solvent used for preparing the olefin polymerization catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons such as benzene, toluene and xylene; halogenated hydrocarbons, such as ethylene chloride, chlorobenzene and dichloromethane; and mixtures of these hydrocarbons.

The components for preparing the olefin polymerization catalyst may be mixed in any order, but it is preferred that:

the component (a) is mixed with the component (b);

the component (b) is mixed with the component (c), then with the component (a);

the component (a) is mixed with the component (b), then with the component (c); or the component (a) is mixed with the component (c), then with the component (b).

In the mixing of those components in a solvent, the concentration of the component (a) is desirably in the range of about $10^{-8}$ to $10^{-1}$ mol/liter, preferably $10^{-7}$ to $5 \times 10^{-2}$ mol/liter.

When the component (b-1) is used as the component (b), the component (b-1) is used in such an amount that the atomic ratio of the aluminum in the component (b-1) to the transition metal in the component (a), Al/transition metal, becomes usually 10 to 10,000, preferably 20 to 5,000. When the component (b-2) is used as the component (b), the component (b-2) is used in such an amount that the molar ratio of the component (a) to the component (b-2), (component (a)/component (b-2)), becomes usually 0.01 to 10, preferably 0.1 to 5.

The component (c) can be used, if necessary, in such an amount that the atomic ratio of the aluminum atom (Alc) in the component (c) to the aluminum atom ($Al_{B-1}$) in the component (b-1), ($Al_C/Al_{B-1}$), becomes usually 0.02 to 20, preferably 0.2 to 10.

The above components may be mixed in a polymerization reactor, or a mixture preliminarily prepared may be added to the polymerization reactor.

When the components are preliminarily mixed, the mixing temperature is in the range of usually −50 to 150° C., preferably −20 to 120° C., and the contact time is in the range of usually 1 to 1,000 minutes, preferably 5 to 600 minutes. The mixing temperature may be varied during the mixing procedure.

The olefin polymerization catalyst used in the invention may be a solid olefin polymerization catalyst wherein at least one of the components (a), (b) and (c) is supported on an inorganic or organic, granular or particulate solid carrier.

The inorganic carrier preferably is porous oxide, for example, $SiO_2$ or $Al_2O_3$.

The granular or particulate solid organic compound is, for example, a polymer or a copolymer prepared by the use of an α-olefin (e.g., ethylene, propylene or 1-butene) or styrene as the major component.

In the present invention, an olefin may be prepolymerized with the components for forming the olefin polymerization catalyst.

The olefin used in the prepolymerization is preferably propylene, ethylene or 1-butene, but a mixture consisting of any of these olefins and other olefin is also available.

The olefin polymerization catalyst used in the present invention may further contain other components useful for the olefin polymerization, such as water as a catalyst component, in addition to the above-mentioned components.

The propylene/1-butene random copolymer used in the invention can be prepared by copolymerizing propylene and 1-butene in the presence of the above-described olefin polymerization catalyst in such a manner that the aforesaid monomer ratio is finally obtained.

The polymerization can be carried out by any of a liquid phase polymerization process (e.g., a suspension polymerization process or a solution polymerization process) and a gas phase polymerization process.

In the solution polymerization process, the same inert hydrocarbon solvent as used for preparing the catalyst can be used, or propylene per se can be used as a solvent.

In the suspension polymerization process, the polymerization temperature is desirably in the range of usually −50 to 100° C., preferably 0 to 90° C., while in the solution polymerization process, the polymerization temperature is in the range of usually 0 to 250° C., preferably 20 to 200° C. In the gas phase polymerization process, the polymerization temperature is in the range of usually 0 to 120° C., preferably 20 to 100° C.

The polymerization pressure is in the range of usually atmospheric pressure to 100 kg/cm², preferably atmospheric pressure to 50 kg/cm². The polymerization can be carried out by any of batchwise, semi-continuous and continuous processes.

The polymerization can be carried out in two or more stages under different reaction conditions.

The molecular weight of the resulting propylene/1-butene random copolymer can be controlled by allowing hydrogen to be present in the polymerization system or by varying the polymerization temperature or the polymerization pressure.

In the present invention, the propylene/1-butene random copolymer may be a product having been partially or fully modified with unsaturated carboxylic acids or anhydrides thereof. The modified product of the propylene/1-butene random copolymer has good overlap packaging properties and high bond strength to metals.

To the propylene/1-butene random copolymer, various additives such as heat stabilizers, ultraviolet light absorbers, anti-blocking agents, slip agents and antistatic agents may be added.

Polypropylene Composite Film

The polypropylene composite film according to the present invention comprises:

(A) the crystalline polypropylene layer, and (B) the propylene/1-butene random copolymer layer.

The propylene/1-butene random copolymer layer (B) is a heat-sealing layer and is provided on one or both surfaces of the crystalline polypropylene layer (A) serving as a base layer.

In the polypropylene composite film of the present invention, the crystalline polypropylene layer (A) as the base layer may be unstretched, monoaxially stretched or biaxially oriented as described above. One or both surfaces of the base layer may be subjected to a corona discharge treatment by a known method.

The composite film can be prepared from the crystalline polypropylene and the propylene/1-butene random copolymer by various processes. For example, the polypropylene composite film comprising the unstretched polypropylene layer (A) and the propylene/1-butene random copolymer layer (B) can be obtained by the following processes.

(1) The crystalline polypropylene and the propylene/1-butene random copolymer are co-extruded to form a laminate.

(2) On a film of the crystalline polypropylene, the propylene/1-butene random copolymer is melt-extruded to form a laminate.

(3) A film of the crystalline polypropylene and a film of the propylene/1-butene random copolymer are combined together with an adhesive.

Of the above processes, the processes (1) and (2) are preferred because molding can be readily made and a composite film of stable quality can be obtained.

The polypropylene composite film comprising the biaxially oriented polypropylene layer (A) and the propylene/1-butene random copolymer layer (B) can be obtained by, for example, the following processes.

(1) The crystalline polypropylene and the propylene/1-butene random copolymer are co-extruded to form a laminated sheet, and the laminated sheet is then stretched in the lengthwise and crosswise directions separately or simultaneously.

(2) The crystalline polypropylene is melt-extruded and stretched in the lengthwise or crosswise direction to form a monoaxially stretched base layer. On the monoaxially stretched base layer, the propylene/1-butene random copolymer is melt-extruded or a propylene/1-butene random copolymer film preliminarily prepared is laminated, to form a laminated sheet. The laminated sheet is then stretched in the unstretched direction.

(3) The crystalline polypropylene is melt-extruded and stretched in the lengthwise and crosswise directions separately or simultaneously to form a biaxially oriented base layer. On the biaxially oriented base layer, the propylene/1-butene random copolymer is melt-extruded or a propylene/1-butene random copolymer film preliminarily prepared is laminated.

(4) A biaxially oriented film of the crystalline polypropylene and a film of the propylene/1-butene random copolymer are combined together with an adhesive.

Of the above processes, the process (2) is preferred because molding is readily made and a composite film of stable quality can be obtained.

In the present invention, it is desired that stretch ratio of the biaxially oriented crystalline polypropylene layer (A) serving as a base layer is in the range of 3 to 7 times, preferably 4 to 6 times, in the lengthwise direction, and it is in the range of 3 to 12 times, preferably 6 to 10 times, in the crosswise direction.

In the polypropylene composite film of the present invention, the crystalline polypropylene layer (A) desirably has a thickness of 5 to 200 μm, preferably 10 to 60 μm, and the propylene/1-butene random copolymer layer (B) desirably has a thickness of 0.1 to 50 μm, preferably 0.5 to 20 μm.

EFFECT OF THE INVENTION

The polypropylene composite film according to the present invention is excellent in heat-sealing properties. Particularly, the film can be heat-sealed even at low temperatures, and it can be heat-sealed within a wide temperature range. Moreover, the film has high heat-sealing strength. Further, even when the polypropylene composite film is stored for a long period of time, its heat-sealing temperature does not change with time, and therefore stable heat-sealing operation can be assured.

The polypropylene composite film of the present invention having an unstretched, monoaxially stretched or biaxially oriented crystalline polypropylene layer as the base layer shows excellent transparency, scratch resistance and hot tack properties. In addition, this film is almost free from surface tackiness and has excellent slip properties and blocking resistance at high temperatures, so that it is suitable for high-speed packaging.

The polypropylene composite film of the present invention having the above-mentioned excellent properties can be favorably used for packaging of foods, fill packaging and fiber packaging.

EXAMPLE

The present invention will be further described with reference to the following examples, but it should be construed that the invention is in no way limited to those examples.

Measurement of Properties of Propylene/1-Butene Random Copolymer (1) Propylene content, 1-Butene content The propylene content and the 1-butene content were determined using $^{13}$C-NMR.

(2) Intrinsic viscosity (η)

The intrinsic viscosity (η) was measured in Decalin (decahydronaphthalene, E.I. duPont de Nemours & Co., Wilmington, Del.) at 135° C. and expressed by dl/g.

(3) Molecular weight distribution (Mw/Mn)

The molecular weight distribution (Mw/Mn) was measured in the following manner using GPC-150C produced by Millipore Co.

A separatory column of TSK-GNH-HT having a diameter of 27 mm and a length of 600 mm was used. The column temperature was set to 140° C. A sample (concentration: 0.1% by weight, amount: 500 μl) was moved in the column at a rate of 1.0 ml/min using o-dichlorobenzene (available from Wako Junyaku Kogyo K. K.) as a mobile phase and 0.025% by weight of BHT (available from Takeda Chemical Industries, Ltd.) as an antioxidant. A differential refractometer was used as a detector.

Standard polystyrenes available from Toso Co., Ltd. were used as those of Mw<1,000 and Mw>4×10$^6$, and standard polystyrenes available from Pressure Chemical Co. were used as those of 1,000<Mw<4×10$^6$.

(4) B value (monomer distribution)

The monomer distribution B value was determined in the following manner. A $^{13}$C-NMR spectrum of a sample obtained by homogeneously dissolving about 200 mg of a copolymer in 1 ml of hexachlorobutadiene in a sample tube having a diameter of 10 mm was measured under the measuring conditions of usually a temperature of 120° C., a frequency of 25.05 MHz, a spectral width of 1,500 Hz, a filter width of 1,500 Hz, pulse repetition time of 4.2 sec and integrating times of 2,000 to 5,000. From the spectrum obtained, $P_E$, $P_O$ and $P_{OE}$ were sought, and the B value was calculated using $P_E$, $P_O$ and $P_{OE}$.

(5) Melting point (Tm)

The melting point (Tm) was measured in the following manner using a DSC-7 type measuring device (differential scanning calorimeter, DSC) produced by Perkin Elmer Co. About 5 mg of a sample charged in an aluminum pan was heated up to 200° C., kept at 200° C. for 5 minutes, then cooled to −40° C. at a rate of 10° C./min, kept at −40° C. for 5 minutes and finally heated at a rate of 10° C./min, to obtain an endothermic curve of the sample. From the endothermic curve, the melting point (Tm) was determined.

(6) Crystallinity

The crystallinity was determined by subjecting a pressed sheet having a thickness of 1.0 mm to X-ray diffractometry after at least 24 hours had passed since the sheet was formed.

Measurement of Properties of Composite Film (1) Haze

The haze was measured in accordance with ASTM D1003.

(2) Change of haze with time

The composite film was maintained at 80° C. for 3 days and allowed to stand for cooling. Then, the haze was measured in the same manner as in the measurement (1).

(3) Glossiness

The glossiness was measured in accordance with ASTM D523.

(4) Tear strength (Elmendorf tear strength)

The tear strength was measured in accordance with ASTM D1922.

(5) Slip properties

The slip properties were measured in accordance with ASTM D1894.

(6) Change of slip properties with time

The composite film was kept at 40° C. for one week and allowed to stand for cooling. Then, the slip properties were measured in the same manner as in the measurement (5).

(7) Blocking resistance

The blocking resistance was measured in accordance with ASTM D1893.

(8) Change of blocking resistance with time

The composite film was kept at 50° C. for one week and allowed to stand for cooling. Then, the blocking resistance was measured in the same manner as in the measurement (7).

(9) Heat-sealing strength

Two of the composite films were superposed one upon another in such a manner that the propylene/1-butene random copolymer layers (B) faced each other, and they were heat-sealed at each temperature of 80° C., 90° C., 100° C., 110° C., 120° C., 130° C., 140° C. and 150° C. for 1 second under a pressure of 2 kg/cm$^2$ by means of a seal bar having a width of 5 mm. Then, the heat-sealed films were allowed to stand for cooling.

The sample thus heat-sealed at each temperature was cut to give a specimen having a width of 15 mm. The heat-sealed portion of the specimen was peeled at a cross head speed of 300 mm/min to measure the peel strength.

(10) Hot tack properties (a) Hot tack properties in Examples 1 to 4 and Comparative Example 1

Two of the composite films were superposed one upon another in such a manner that the propylene-1-butene random copolymer layers (B) faced each other, and they were heat-sealed at each temperature of 70° C., 80° C., 90° C., 100° C., 110° C., 120° C. and 130° C. for 1 second under a pressure of 2 kg/cm². Then, the heat-sealed portion of the specimen was peeled at a cross head speed of 500 mm/min to measure the peel strength.

(b) Hot tack properties in Examples 5 to 8 and Comparative Example 2

Two of the composite films were superposed one upon another in such a manner that the propylene-1-butene random copolymer layers (B) faced each other, and they were heat-sealed at each temperature of 90° C., 100° C., 110° C., 120° C., 130° C., 140° C. and 150° C. for 1 second under a pressure of 2 kg/cm². Then, a peeled distance of the heat-sealed portion was measured under a load of 45 g.

Preparation Example 1
Preparation of Propylene/1-Butene Random Copolymer

To a 2-liter autoclave thoroughly purged with nitrogen were introduced 900 ml of hexane and 60 g of 1-butene, followed by adding 1 mmol of triisobutylaluminum. After the temperature of the system was elevated to 70° C., propylene was fed so that the total pressure became 7 kg/cm²-G, and 0.30 mmol of methylaluminoxane and 0.001 mmol (in terms of Zr atom) of rac-dimethylsilylene-bis{1-(2-methyl-4-phenylindenyl)}zirconium dichloride were further added. The polymerization was performed for 30 minutes while propylene was continuously fed to keep the total pressure at 7 kg/cm²-G. After the polymerization, the autoclave was released, and a polymer was recovered in a large amount of methanol and dried in vacuum dried at 110° C. for 12 hours.

Thus, the amount of the polymer (propylene/1-butene random copolymer) obtained was 39.7 g, and the polymerization activity was 79 kg-polymer/mmol-Zr·hr. This polymer contained constituent units derived from 1-butene in amounts of 24% by mol, and had an intrinsic viscosity ($\eta$) of 1.63 dl/g and a melting point of 92° C. The properties of the polymer are set forth in Tables 1 and 2.

Preparation Examples 2–4

Propylene/1-butene random copolymers were obtained in the same manner as in Preparation Example 1 except that the amounts of hexane, 1-butene and propylene were used as shown in Tables 1 and 2.

The properties of the polymers are set forth in Tables 1 and 2.

Preparation Example 5

To a 2-liter autoclave thoroughly purged with nitrogen were introduced 830 ml of hexane and 100 g of 1-butene, followed by adding 1 mmol of triisobutylaluminum. After the temperature of the system was elevated to 70° C., propylene was fed so that the total pressure became 7 kg/cm²-G, and 1 mmol of triethylaluminum and 0.005 mmol (in terms of Ti atom) of a titanium catalyst supported on magnesium chloride were further added. The polymerization was performed for 30 minutes while propylene was continuously fed to keep the total pressure at 7 kg/cm²-G. After the polymerization, the autoclave was released and a polymer was recovered in a large amount of methanol and dried in vacuum at 110° C. for 12 hours.

Thus, the amount of the polymer obtained was 33.7 g, and the polymerization activity was 14 kg-polymer/mmol-Zr·hr. This polymer contained constituent units derived from 1-butene in amounts of 23% by mol, and had an intrinsic viscosity ($\eta$) of 1.91 dl/g and a melting point of 110° C.

The properties of the polymer are set forth in Tables 1 and 2.

Examples 1–4

The propylene/1-butene random copolymer (PBR) prepared above was melted in an extruder and fed to a composite film-forming T-die at a resin temperature of 200° C.

Separately, homopolypropylene having an isotactic index (I.I.) of 96% and a melt index of 6.5 was fed to the above-mentioned T-die at a resin temperature of 220° C. by way of another extruder.

Both of the above resins were co-extruded to obtain a composite film consisting of a homopolypropylene layer (A) (base layer) having a thickness of 45 $\mu$m and a propylene-1-butene random copolymer layer (B) (heat-sealing layer) having a thickness of 5 $\mu$m.

The results are set forth in Table 1.

Comparative Example 1

A composite film was obtained in the same manner as in Example 1 except that the heat-sealing layer was formed from the propylene/1-butene random copolymer prepared in Preparation Example 5.

The results are set forth in Table 1.

TABLE 1

| | Ex. 1 | Com. Ex. 1 | Ex. 2 | Ex. 3 | Ex. 4 |
|---|---|---|---|---|---|
| (B) PBR layer | Prep. Ex. 1 | Prep. Ex. 5 | Prep. Ex. 2 | Prep. Ex. 3 | Prep. Ex. 4 |
| (1) Propylene content (mol %) | 76 | 77 | 81 | 85 | 91 |
| 1-butene content (mol %) | 24 | 23 | 19 | 15 | 9 |
| (2) Intrinsic viscosity ($\eta$) (dl/g) | 1.63 | 1.91 | 1.65 | 1.67 | 1.69 |
| (3) Mw/Mn | 2.05 | 4.52 | 2.10 | 2.18 | 2.17 |
| (4) B value | 1.00 | 0.92 | 1.02 | 1.03 | 1.03 |
| (5) Tm (° C.) | 92 | 110 | 103 | 110 | 129 |
| (6) Crystallinity (%) | 40 | 48 | 49 | 53 | 62 |
| Thickness | | | | | |
| (A) Base layer ($\mu$m) | 45 | 45 | 45 | 45 | 45 |
| (B) PBR layer ($\mu$m) | 5 | 5 | 5 | 5 | 5 |
| (1) Haze (%) | 2.1 | 1.8 | 2.5 | 2.1 | 2.0 |
| (2) Change of haze with time (%) | 2.4 | 4.6 | 2.3 | 2.2 | 2.4 |
| (3) Glossiness (%) | 110 | 120 | 110 | 110 | 110 |
| (4) Tearing strength (kg/cm) | | | | | |
| lengthwise | 11 | 12 | 13 | 13 | 12 |
| crosswise | 53 | 80 | 64 | 66 | 73 |
| (5) Slip properties | | | | | |
| /static friction | 0.2 | 0.2 | 0.2 | 0.1 | 0.2 |
| /dynamic friction | 0.1 | 0.1 | 0.1 | 0.1 | 0.2 |
| (6) blocking resistance (g/cm) | 1.1 | 5.2 | 0.2 | 0.2 | 0.2 |
| (7) Heat-sealing strength (g/15 mm) | | | | | |
| 80° C. | 320 | 10 | 210 | 10 | |
| 90° C. | 1680 | 40 | 1510 | 130 | |
| 100° C. | 1730 | 300 | 1620 | 1590 | |
| 110° C. | 1830 | 1620 | 1870 | 1920 | 40 |
| 120° C. | 2040 | 1620 | 1870 | 1760 | 530 |

TABLE 1-continued

| | Ex. 1 | Com. Ex. 1 | Ex. 2 | Ex. 3 | Ex. 4 |
|---|---|---|---|---|---|
| 130° C. | 1910 | 1820 | 1930 | 2060 | 2000 |
| 140° C. | | | | | 2460 |
| 150° C. | | | | | 2080 |
| (8) Hot tack properties (N/20 mm) | | | | | |
| 70° C. | 3.9 | 3.5 | 4.5 | 2.5 | |
| 80° C. | 5.7 | 3.8 | 9.1 | 6.5 | 0.6 |
| 90° C. | 6.4 | 3.8 | 7.1 | 8.4 | 3.6 |
| 100° C. | 6.0 | 3.9 | 5.8 | 7.2 | 4.3 |
| 110° C. | 6.4 | 3.9 | 5.4 | 5.9 | 6.1 |
| 120° C. | 5.7 | 4.6 | 5.4 | 5.0 | 4.8 |
| 130° C. | 6.7 | 4.2 | 4.6 | 5.2 | 3.6 |

Examples 5–8

Homopolypropylene having an isotactic index (I.I.) of 96% and a melt index of 1.5 was molded into a sheet at 240° C. and stretched at 140° C. in a stretch ratio of 5 times in the lengthwise direction.

The sheet thus obtained was used as a base layer. On one surface of the base layer, a layer of the propylene/1-butene random copolymer (PBR) prepared in each of Preparation Examples 1 to 4 was laminated in the following manner.

100 Parts by weight of the propylene/1-butene random copolymer was mixed with 0.1 part by weight of an antiblocking agent and 0.16 part by weight of a slip agent. The resulting mixture was melted in an extruder and then extruded on the base layer at 200° C. to form a laminated sheet.

The laminated sheet was stretched at 170° C. in a stretch ratio of 10 times in the crosswise direction. Then the sheet was cooled, while being substantially maintained in the stretched state.

Thus, a biaxially oriented composite film consisting of a homopolypropylene layer (A) (base layer) having a thickness of 22 μm and a propylene/1-butene random copolymer layer (B) (heat-sealing layer) having a thickness of 3 μm was obtained.

The results are set forth in Table 2.

Comparative Example 2

A composite film was obtained in the same manner as in Example 5 except that the heat-sealing layer was formed from the propylene/1-butene random copolymer prepared in Preparation Example 5.

The results are set forth in Table 2.

TABLE 2

| | Ex. 5 | Com. Ex. 2 | Ex. 6 | Ex. 7 | Ex. 8 |
|---|---|---|---|---|---|
| (B) PBR layer | Prep. Ex. 1 | Prep. Ex. 5 | Prep. Ex. 2 | Prep. Ex. 3 | Prep. Ex. 4 |
| (1) Propylene content (mol %) | 76 | 77 | 81 | 85 | 91 |
| 1-butene content (mol %) | 24 | 23 | 19 | 15 | 9 |
| (2) Intrinsic viscosity (η) (dl/g) | 1.63 | 1.91 | 1.65 | 1.67 | 1.69 |
| (3) Mw/Mn | 2.05 | 4.52 | 2.10 | 2.18 | 2.17 |
| (4) B value | 1.00 | 0.92 | 1.02 | 1.03 | 1.03 |

TABLE 2-continued

| | Ex. 5 | Com. Ex. 2 | Ex. 6 | Ex. 7 | Ex. 8 |
|---|---|---|---|---|---|
| (5) Tm (° C.) | 92 | 110 | 103 | 110 | 129 |
| (6) Crystallinity (%) | 40 | 48 | 49 | 53 | 62 |
| Thickness | | | | | |
| (A) Base layer (μm) | 22 | 22 | 22 | 22 | 22 |
| (B) PBR layer (μm) | 3 | 3 | 3 | 3 | 3 |
| (1) Haze (%) | 0.3 | 1.9 | 0.6 | 0.5 | 0.5 |
| (2) Change of haze with time (%) | 0.3 | 2.5 | 0.7 | 0.5 | 0.5 |
| (3) Glossiness (%) | 140 | 130 | 130 | 130 | 130 |
| (4) Slip properties | | | | | |
| /static friction | 3.3 | non slip | 0.3 | 0.3 | 0.4 |
| /dynamic friction | 3.3 | non slip | 0.3 | 0.3 | 0.4 |
| (5) Change of slip properties with time | | | | | |
| /static friction | 2.3 | non slip | 0.3 | 0.4 | 0.5 |
| /dynamic friction | 2.4 | non slip | 0.3 | 0.3 | 0.3 |
| (6) blocking resistance (g/cm) | 4.1 | >10 | 0.4 | 0.1 | 0.2 |
| (7) Change of blocking resistance with time (g/cm) | 6.3 | >10 | 0.8 | 0.1 | 0.3 |
| (8) Heat sealing strength (g/15 mm) | | | | | |
| 80° C. | 10 | | | | |
| 90° C. | 700 | 50 | 20 | | |
| 100° C. | 900 | 260 | 700 | 10 | |
| 110° C. | 750 | 450 | 700 | 510 | |
| 120° C. | 750 | 540 | | 430 | 10 |
| 130° C. | | 540 | | 410 | 460 |
| 140° C. | | | | | 450 |
| 150° C. | | | | | 460 |
| (9) Hot tack properties (mm) | | | | | |
| 90° C. | 120 | 300 | 300 | | |
| 100° C. | 20 | 250 | 130 | 300 | |
| 110° C. | 15 | 40 | 18 | 150 | 300 |
| 120° C. | 7 | 20 | 10 | 20 | 120 |
| 130° C. | 6 | 18 | 6 | 11 | 25 |
| 140° C. | 6 | 17 | 7 | 7 | 5 |
| 150° C. | 7 | 20 | 7 | 5 | 5 |

What is claimed is:

1. A polypropylene composite film comprising:
   (I) a crystalline polypropylene layer, and
   (II) a propylene/1-butene random copolymer layer laminated on at least one surface of the crystalline polypropylene layer (I):
   said propylene/1-butene random copolymer (II) having the following properties:
   (1) the copolymer contains 60 to 85% by mol of constituent units derived from propylene and 40 to 15% by mol of constituent units derived from 1-butene,
   (2) the intrinsic viscosity, as measured in decahydronaphthalene at 135° C., is in the range of 1 to 5 dl/g,
   (3) the molecular weight distribution, $M_w/M_n$, as determined by gel permeation chromatography, is not more than 3, and
   (4) a parameter B value, which indicates the randomness of the copolymer, is in the range of 1.0 to 1.5, wherein $$B = P_{12}/(2P_1 \cdot P_2)$$

where $P_1$ is a first monomer content fraction, $P_2$ is a second monomer content fraction, and $P_{12}$ is a proportion of the first monomer—second monomer sequences to the total diad sequences.

2. The polypropylene composite film as claimed in claim 1, wherein the crystalline polypropylene layer (I) is an unstretched, monoaxially stretched or biaxially oriented crystalline polypropylene layer.

3. The polypropylene composite film as claimed in claim 1 or claim 2, wherein the parameter B value, which indicates the randomness of the copolymer, of the propylene/1-butene random copolymer (II) is in the range of 1.0 to 1.3, and the copolymer (II) further has the following properties:

(5) the melting point $T_m$, as measured by differential scanning calorimeter, is in the range of 60 to 140° C., and the melting point $T_m$ and the content M of constituent units derived from 1-butene measured in % by mol satisfy the following relation:

$$-2.6M+130 \leq T_m \leq -2.3M+155$$

and (6) the crystallinity C, as measured by X-ray diffractometry, and the content M of constituent units derived from 1-butene measured in % by mol satisfy the following relation:

$$C \leq -1.5M+75.$$

4. The polypropylene composite film as claimed in claim 1 or claim 2, wherein the propylene/1-butene random copolymer (II) is prepared by copolymerizing propylene and 1-butene in the presence of an olefin polymerization catalyst comprising:

(a) a transition metal compound represented by the following formula (I):

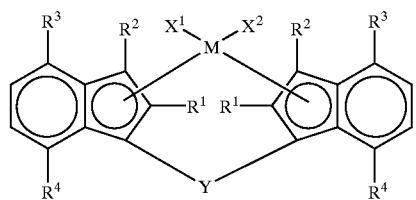

(I)

wherein M is a transition metal of Group IVb, Vb or VIb of the periodic table, $R^1$ and $R^2$ are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^3$ is a secondary or tertiary alkyl group of 3 to 20 carbon atoms or an aromatic group, $R^4$ is hydrogen or an alkyl group of 1 to 20 carbon atoms, $X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$— (R$^5$ is hydrogen, a halogen atom, a hydrocarbon group of 1 to 20 carbon atoms or a halogenated hydrocarbon group of 1 to 20 carbon atoms);

(b) (b-1) an organoaluminum oxy-compound and/or (b-2) a compound which reacts with the transition metal compound (a) to form an ion pair;

and, optionally, (c) an organoaluminum compound.

5. The propylene composite film as claimed in claim 4, wherein $R^1$ in the formula (I) representing the transition metal compound (a) is methyl.

6. A polypropylene composite film comprising:

(I) a crystalline polypropylene layer, and (II) a propylene/1-butene random copolymer layer laminated on at least one surface of the crystalline propylene layer (I);

said propylene/1-butene random copolymer layer (II) consisting of a propylene/1-butene random copolymer, and optionally, one or more additives selected from the group consisting of heat stabilizers, ultraviolet light absorbers, anti-blocking agents, slip agents and anti-static agents;

said propylene/1-butene random copolymer having the following properties:

(1) the copolymer contains 60 to 85% by mol of constituent units derived from propylene and 40 to 15% by mol of constituent units derived from 1-butene, (2) the intrinsic viscosity, as measured in decahydronaphthalene at 135° C., is in the range of 1 to 5 dl/g, (3) the molecular weight distribution, $M_w/M_n$, as determined by gel permeation chromatography, is not more than 3, and (4) a parameter B value, which indicates the randomness of the copolymer, is in the range of 1.0 to 1.5, wherein $$B=P_{12}/(2P_1 \cdot P_2)$$

where $P_1$ is a first monomer content fraction, $P_2$ is a second monomer content fraction, and $P_{12}$ is a proportion of the first monomer—second monomer sequences to the total diad sequences.

* * * * *